(12) United States Patent
Takahashi

(10) Patent No.: US 10,939,199 B2
(45) Date of Patent: Mar. 2, 2021

(54) SIGNAL GENERATOR FOR GENERATING POWER CHANGE SIGNAL TO DRIVE SPEAKER, SPEAKER, SPEAKER FILTER

(71) Applicant: Kota Takahashi, Hino (JP)

(72) Inventor: Kota Takahashi, Hino (JP)

( * ) Notice: Subject to any disclaimer, the term of this patent is extended or adjusted under 35 U.S.C. 154(b) by 0 days.

(21) Appl. No.: 16/629,315

(22) PCT Filed: Jul. 19, 2017

(86) PCT No.: PCT/JP2017/026051
§ 371 (c)(1),
(2) Date: Jan. 8, 2020

(87) PCT Pub. No.: WO2019/016881
PCT Pub. Date: Jan. 24, 2019

(65) Prior Publication Data
US 2020/0145751 A1    May 7, 2020

(51) Int. Cl.
*H04R 3/00* (2006.01)
*G06F 7/57* (2006.01)
*H04R 3/08* (2006.01)

(52) U.S. Cl.
CPC ............... *H04R 3/00* (2013.01); *G06F 7/57* (2013.01); *H04R 3/08* (2013.01)

(58) Field of Classification Search
CPC .......... H04R 3/00; H04R 3/002; H04R 3/007; H04R 3/02; H04R 3/04; H04R 3/08; H04R 29/001; H04R 29/003; H04R 2203/00; G06F 7/57
See application file for complete search history.

(56) References Cited

U.S. PATENT DOCUMENTS

| | | | | |
|---|---|---|---|---|
| 2015/0319529 A1* | 11/2015 | Klippel | ................. | H04R 3/007 381/55 |
| 2016/0052360 A1* | 2/2016 | Kubota | ................ | B60G 17/018 701/37 |
| 2017/0019732 A1* | 1/2017 | Mendes | ................. | H04R 3/007 |

FOREIGN PATENT DOCUMENTS

| | | |
|---|---|---|
| JP | H09-18989 A | 1/1997 |
| JP | 2005-102262 A | 4/2005 |
| JP | 2009-10824 A | 1/2009 |
| JP | 2011-182177 A | 9/2011 |
| JP | 2012-195800 A | 10/2012 |

OTHER PUBLICATIONS

International Search Report for PCT/JP2017/026051 dated Oct. 17, 2017.

* cited by examiner

*Primary Examiner* — Davetta W Goins
*Assistant Examiner* — Daniel R Sellers
(74) *Attorney, Agent, or Firm* — Yokoi & Co., U.S.A.; Toshiyuki Yokoi

(57) ABSTRACT

The present invention is invented for reproducing the sound more faithfully by newly adding elements related to resistance and friction when calculating a power change signal for driving a speaker. In the signal generated by a signal generator, a rise of the signal is sharp when moving from the static state. Consequently, a diaphragm of the speaker can start to move in accordance with the original sound reproduction method.

6 Claims, 4 Drawing Sheets

SIGNAL GENERATOR FOR GENERATING POWER CHANGE SIGNAL TO DRIVE SPEAKER, SPEAKER, SPEAKER FILTER

TECHNICAL FIELD

The present invention relates to various devices for reproducing sound using a speaker.

BACKGROUND ART

Conventionally, when the sound is reproduced by using the speaker, a signal of the sound picked up by a microphone is amplified as it is to reproduce the sound.

However, it is difficult in the above described method to reproduce an original sound faithfully since a power change signal to drive the speaker is not used. Therefore, the original sound reproduction method was proposed as a method of calculating the power change signal from the signal of the sound and then driving the speaker by the calculated power change signal.

However, resistance generated when the sound pushes the air and resistance/friction generated when mechanisms of the speaker operate were not dealt with in the proposed original sound reproduction method.

The original sound reproduction method has already been reported by the inventor of the present invention as shown in Japanese Patent Application Laid-Open No. H09-018989 and Japanese Patent Application Laid-Open No. 2005-102262.

In addition, in 109th Music and computer workshop of Information Proceeding Society of Japan held on Nov. 7, 2017, the inventor conducted a presentation together with a research paper about the original sound reproduction method which was the base of the present invention. The presentation has delivered as a video to many and unspecified persons. The video was delivered by using Niconico Video which was recommended by Information Proceeding Society of Japan as an information sharing means.

Internet <URL: http://live.nicovideojp/gate/lv241118138>

PRIOR ART DOCUMENTS

Patent Documents

[Patent Document 1] Japanese Patent Application Laid-Open No. H09-018989
[Patent Document 2] Japanese Patent Application Laid-Open No. 2005-102262

Non-Patent Documents

[Non-patent Document 1] Kota TAKAHASHI, "Research about reproduction signal of sound" [online], Nov. 7, 2015, Information Proceeding Society of Japan, 109th Music and computer workshop, [searched on Nov. 24, 2015], Internet

DISCLOSURE OF THE INVENTION

Problems to be Solved by the Invention

The principle of the original sound reproduction method has already published. Although the obtained reproduction performance was almost satisfactory when the speaker is actuary driven, there was a room for further improvement.

In addition, when a signal generator based on the original sound reproduction method was used, the conventional speaker system corresponding to the conventional signal generator was not enough.

Although the signal generator based on the original sound reproduction method may be used by using the conventional speaker system corresponding to the conventional signal generator, there was a room for improvement to achieve that.

Considering the above described problems, the present invention provides a signal generator, a speaker and a speaker filter.

Means for Solving the Problem

The original sound reproduction method deals with the power change signal. Thus, more preferable result can be obtained compared to the conventional method in which the sound signal is amplified as it is to drive the speaker. However, the inventor of the present invention found out that the influences of the resistance and friction were different between an acceleration period and a deceleration period. Therefore, the power change signal is calculated considering the influence of the resistance and friction separately in the acceleration period and the deceleration period. Thus, the drive signal is generated for vibrating the speaker more correctly.

In the present invention, a signal generator for obtaining a drive signal of a speaker by a predetermined calculation based on an audio signal at minute time intervals in an acceleration period in which the speaker operates to push air toward a predetermined direction and in a deceleration period in which the speaker performs a deceleration operation contrary to the acceleration period, the signal generator having: an audio signal input unit for inputting the audio signal at the minute time intervals; an arithmetic unit calculating the drive signal of the speaker; and a drive signal output unit for outputting the drive signal of the speaker, wherein in the arithmetic unit, an acceleration coefficient for calculating the drive signal in the acceleration period is different from a deceleration coefficient for calculating the drive signal in the deceleration period.

In the apparatus configured above, as an example, whether the speaker is in the acceleration period or in the deceleration period is judged from the sound signal. When the speaker is judged to be in the acceleration period, a predetermined acceleration coefficient is multiplied to the calculated value of the power change signal. When the speaker is judged to be in the deceleration period, a predetermined deceleration coefficient is multiplied to the calculated value of the power change signal.

The drive signal of the speaker is generated by using the time series values calculated as explained above.

The method of judging whether the speaker is in the acceleration period or in the deceleration period is as follows. For the sound signals provided with positive and negative signs, quantified and neighbored to each other in time series, a magnitude of the absolute value is compared between the previous value and the next value which is immediately next to the previous value. When the next value is larger than the previous value, the speaker is judged to be in the acceleration period. When the previous value is larger than the next value, the speaker is judged to be in the deceleration period.

When both the previous value and the next value are 0 or when the magnitude cannot be judged at all (e.g., same value), whether the speaker is in the acceleration period or in the deceleration period cannot be judged. Thus, when the power change signal is calculated, a preliminary determined value which is smaller than the value multiplied in the acceleration period in absolute value and larger than the value multiplied in the deceleration period in absolute value is multiplied.

When the values multiplied in the acceleration period and in the deceleration period are determined, the optimal values should be determined for each speaker. Thus, the optimal values are determined by identifying the speaker, actually giving several coefficients by an oscillator on a trial basis in the frequency between the upper limit and the lower limit of the frequency band reproduced by the speaker, and listening and measuring the sound to confirm effect. Thus, the optimal values are determined.

In the above described signal generator, the signal is +6 dB/oct in the frequency band to be reproduced. Therefore, the speaker itself driven by the above described signal has a property of approximately −6 dB/oct with respect to a frequency band to be reproduced and does not include a circuit and a mechanism for eliminating a high frequency component having a higher frequency than the frequency band to be reproduced.

Furthermore, the signal of the signal generator of the present invention uses the power change signal in the acceleration period and in the deceleration period as the drive signal. The speaker should be adjusted on the condition that the above described signal is supplied.

When the standard values of the above described signal are determined for the acceleration period and the deceleration period, the speaker can be preliminarily adjusted to operate by the determined standard values. Also in such a case, the same effect can be obtained. In such a case, it is not necessary to preliminarily determine the optimal values by actually combining the power signal generator and the speaker for listening and measuring the sound.

In the conventional speaker system, if the signal of the present invention is given to drive a single-unit (full-range) speaker without being interposed by a filter such as a network, the reproduction performance is inferior to the speaker having a special property. However, it is not impossible to reproduce the sound. Thus, the present invention can be used while recognizing the above described limitation. In the above described case, when the signal of the present invention is given to the conventional speaker as it is, since the signal itself has a property of +6 dB/oct, the reproduced sound also has a property of +6 dB/oct unless the above described influence is corrected. Therefore, it is necessary to perform a filtering processing of −6 dB/oct to the sound signal to be reproduced immediately before generating the signal of the present invention. This is achieved by arranging the device for performing the filtering processing just before the signal processor of the present invention.

The signal generator of the present invention and the speaker having a property of −6 dB/oct with respect to a frequency band to be reproduced can be combined via an amplifier to achieve the present invention. The combination can be achieved by integrating them together, defining them as a combination, or packing them together so that a user can connect them with each other. As for the property of −6 dB/oct with respect to a frequency band to be reproduced, the property can be set to approximately −6 dB/oct if it is difficult to set the property exactly.

The signal generator of the present invention and the conventional speaker can be combined via an amplifier by performing a filtering processing of −6 dB/oct in a frequency band to the sound signal to be reproduced to achieve the present invention. The combination can be achieved by integrating them together, defining them as a combination, or packing them together so that a user can connect them with each other. However, when a plurality of speaker units (e.g., for high-pitched sound, for middle-pitched sound and for low-pitched sound) is provided, it is necessary to adopt a multiple amplifier system. Namely, amplifiers should be prepared for each speaker unit. In addition, a high-cut filter for eliminating the components having the frequency higher than the frequency band to be reproduced should not be equipped as a circuit or mechanism.

The signals outputted from the signal generator of the present invention includes the components having an extremely high frequency which is required for driving the speaker. Therefore, if the circuit or mechanism for eliminating such components is provided, the effect of the present invention cannot be obtained sufficiently. Thus, it is necessary to be careful.

Effects of the Invention

The present invention has effects described below.

In the conventional sound reproduction device, the sound signal is amplified as it is to drive the speaker. However, in the conventional method, it is difficult to actively control the vibration. Therefore, the original sound reproduction method is invented as a method of reproducing the sound more faithfully using the power change signal when a diaphragm (vibration plate) having a weight is vibrated or air itself is vibrated. When the diaphragm is vibrated or the air itself is vibrated, the resistance and friction affect when the diaphragm or the air moves from a static state. However, the force of the resistance and friction is not conventionally considered. When the devices described in the claims of the present invention are used, the adjustment is enabled according to the resistance and friction. Consequently, fidelity of the sound to be reproduced is further improved.

In the device using the special speaker for the present invention, ideal effect can be obtained. Even when the conventional speaker is used, although the effect is inferior to the special speaker, know-how of durability and the like accumulated for a long time can be inherited and utilized.

MODES FOR CARRYING OUT THE INVENTION

Hereafter, the embodiments of the present invention will be explained with reference to the drawings.

Figure 1:
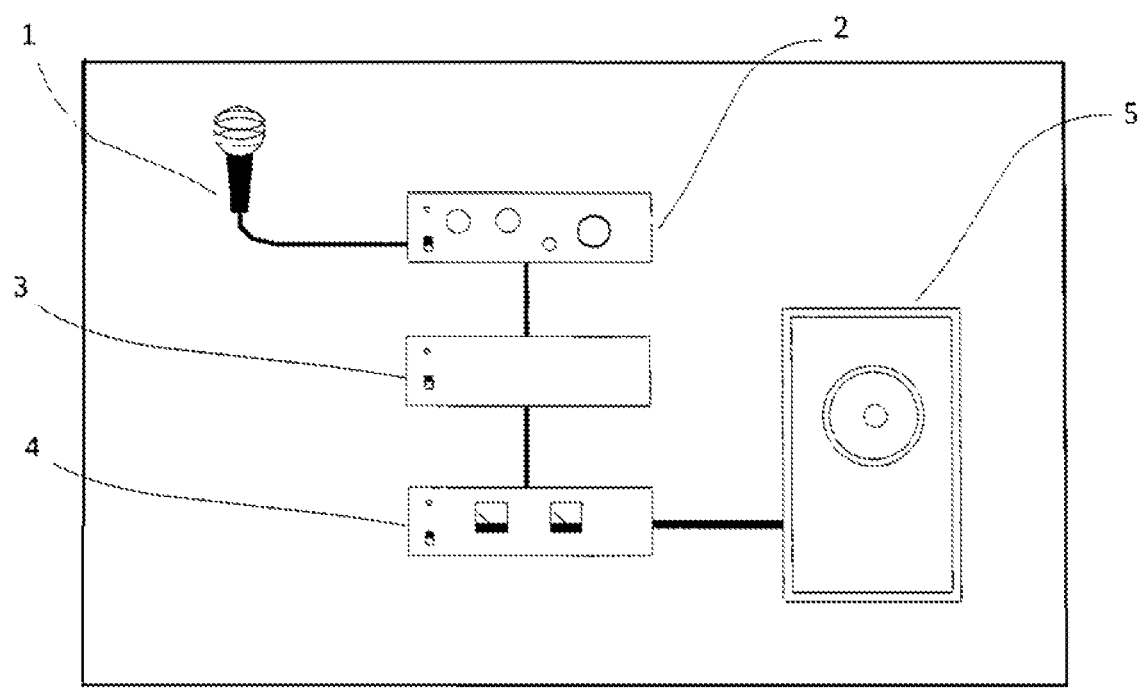
FIG. 1 shows a signal generator by a block diagram concerning an embodiment of the present invention.

FIG. 1 shows a signal generator by a block diagram concerning an embodiment of the present invention.

The signal generator (hereafter, referred to as a power signal generator) is a device for calculating a power change signal to drive a speaker from a sound signal. The signal for driving the speaker is generated so as to correspond to the influence of the resistance and friction when calculating the power required for a direction of pushing air (hereafter, referred to as an acceleration period) and an opposite direction (hereafter, referred to as a deceleration period).

(a) Difference data is acquired in time series by sequentially subtracting the previous value from the next value between the neighboring values in the time-sequential digital signal of the sound quantified at minute time intervals. Whether the acquired difference data is the data of the acceleration period or the data of the deceleration period is judged. When the difference data is judged as the data of the acceleration period, the difference data is multiplied by an acceleration coefficient to generate the time-sequential signal of driving the speaker. When the difference data is judged as the data of deceleration period, the difference data is multiplied by a deceleration coefficient to generate the time-sequential signal of driving the speaker.

(b) As for the relation between the acceleration coefficient and the deceleration coefficient, it is necessary that the acceleration coefficient is larger than the deceleration coefficient in absolute value.

The power signal generator of the present embodiment is a digital signal processor (hereafter, referred to as DSP 3) for executing a predetermined program.

As shown in an overall view (FIG. 1) of a system for reproducing sound, the DSP 3 which is the power signal generator is interposed between a preamplifier 2 and a power amplifier 4. In addition, the reproduction system has a microphone 1 for outputting the signal to the preamplifier 2 and a speaker 5 for inputting a drive signal from the power amplifier 4.

Figure 2:
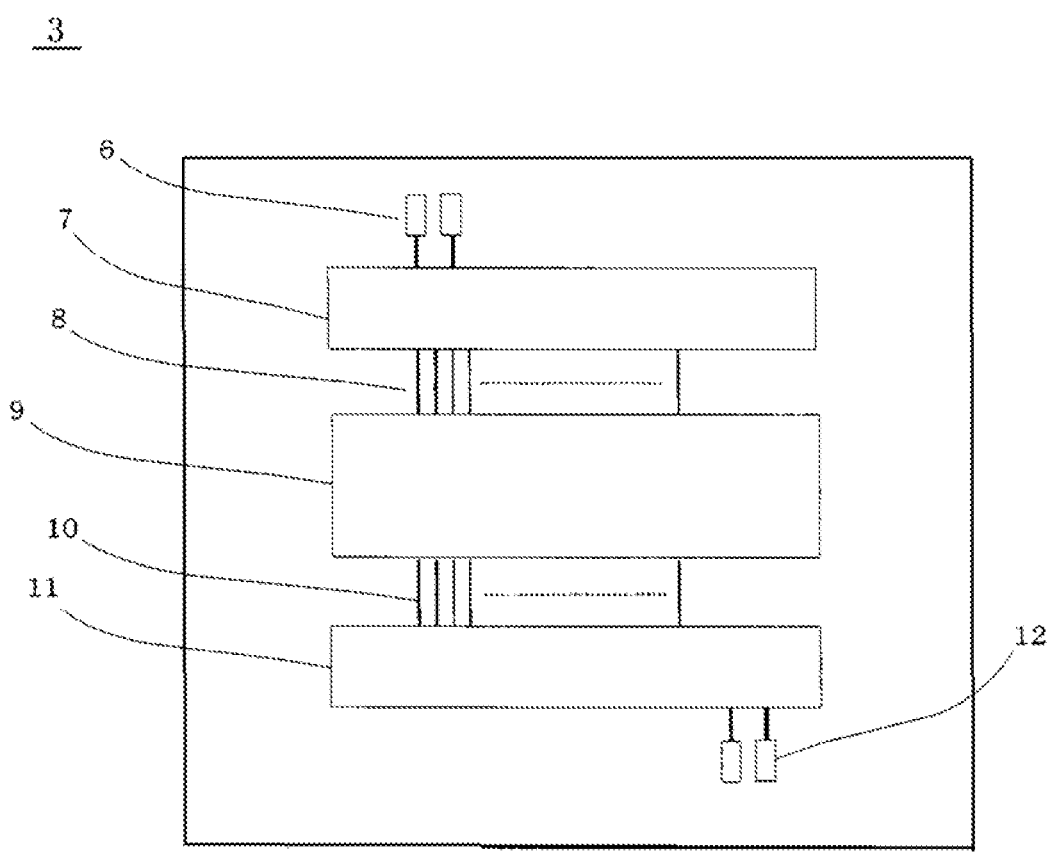
FIG. 2 is a block diagram of a digital signal processor.

FIG. 2 is a block diagram of a digital signal processor.

As shown in FIG. 2, inside the DSP 3 is mainly divided into three mechanisms (blocks): an A/D converter (conversion mechanism) 7; a calculator (calculation mechanism 9); and a D/A converter (conversion mechanism) 11. In addition, the DSP 3 has a sound input signal terminal 6 which is inputted to the A/D converter 7. The output signal of the A/D converter 7 is inputted to the calculator 9 via a digital signal bus 8. The output signal of the calculator 9 is inputted to the D/A converter 11 via a digital signal bus 10. The output signal of the D/A converter 11 is outputted from a speaker drive signal output terminal 12 to the speaker 5.

When the sound signal to be reproduced is an analog signal, the sound signal is converted from analog to digital by the A/D converter 7 shown in FIG. 2. A sampling frequency when the A/D converter 7 performs A/D conversion is currently various such as 44.1 kHz, 48 kHz, 96 kHz and 192 kHz. However, the sampling frequency is not limited to the above described frequencies. It is preferable to sample the signal by as high frequency as possible after the signal is narrowed to the audible range. The calculation is made in the following procedure by the calculator 9 to the time-sequential sound signal as a value digitalized by the sampling.

The signal generator of the present embodiment is directed to digital audio signal. The signal generator performs a predetermined calculation based on the audio signal in minute time intervals. The predetermined calculation is the original sound reproduction method as described above. As explained below, the drive signal of the speaker is calculated by the predetermined calculation in an acceleration period in which the speaker operates to push air toward a predetermined direction and in a deceleration period in which the speaker performs a deceleration operation contrary to the acceleration period.

The DSP 3 has an audio signal input unit for inputting the audio signal in the minute time intervals, an arithmetic unit for calculating the drive signal of the speaker, and a drive signal output unit for outputting the drive signal of the speaker. Specifically, the A/D converter 7 corresponds to the audio signal input unit, the calculator 9 corresponds to the arithmetic unit, and the D/A converter 11 corresponds to the drive signal output unit in the present embodiment. Note that the drive signal output unit can include the power amplifier 4.

Figure 3:
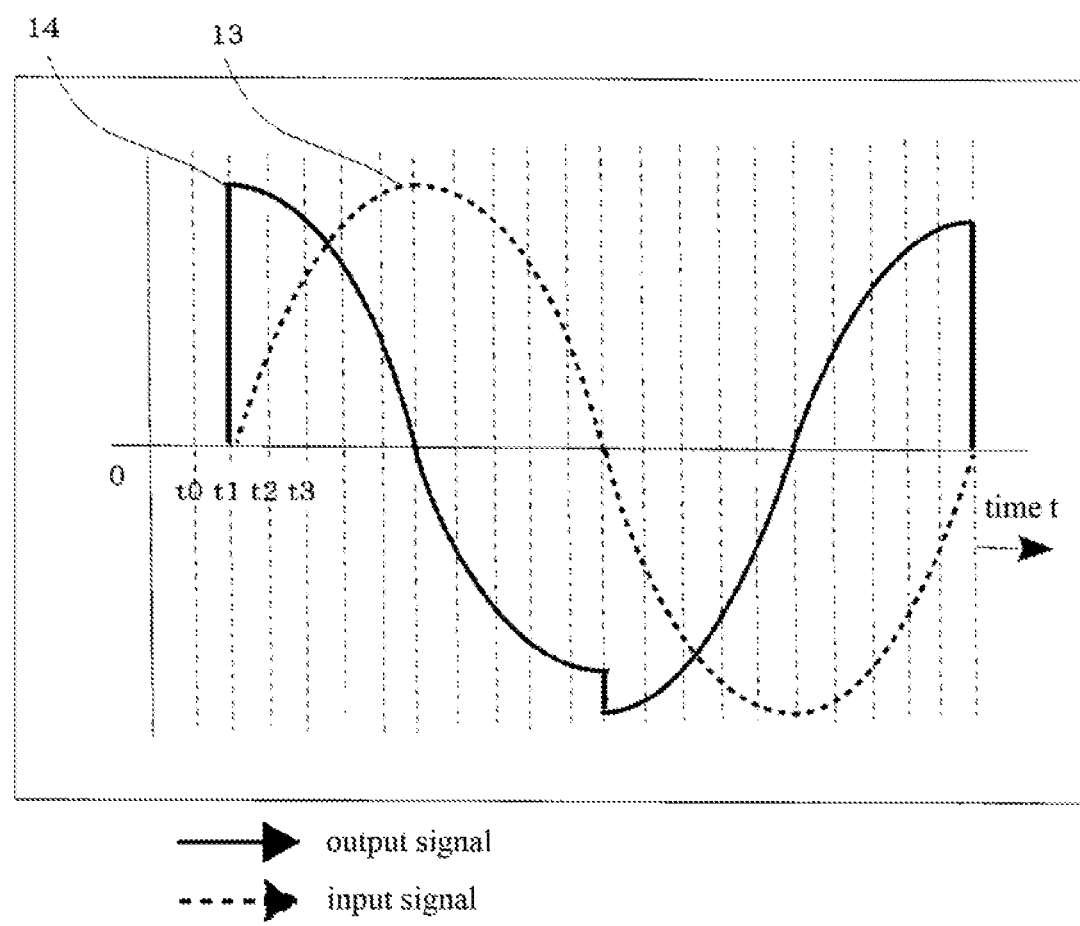
FIG. 3 is a graph showing an input signal and an output signal.

FIG. 3 is a graph showing an input signal and an output signal.

Although the unit is not shown in FIG. 3, the horizontal axis shows a time and the vertical axis shows a speed (velocity) of an input signal 13 (cm/sec). The microphone 1 can be a speed detection type or a sound pressure detection type. The speed detection type is a moving coil type. A dynamic microphone is a typical example of the speed detection type. The input signal of the microphone 1 of speed detection type is proportional to the speed. On the other hand, a condenser microphone is a typical example of the sound pressure detection type. Since the sound pressure is proportional to the speed, the output of the sound pressure detection type is same as the output of the speed detection type as a result. Although the unit of the vertical axis is the pressure in the sound pressure detection type, it can be said that the pressure is substantially synonymous with the speed.

The formula (1) is used as a calculation example.

$$F=G*m(V1-V0) \quad (1)$$

The value of the variable 1 is stored in V1 and the value of the variable 2 is stored in V0 in the formula (1). "m" is determined as a constant for converting the difference data which is a minute value into a value close to the original variable value to facilitate operating.

When both V1 and V0 are 0, the calculation result is always 0 regardless of the values of the coefficients. After the acceleration/deceleration is judged, the value of P is set to G in the acceleration period, the value of R is set to G in the deceleration period, and the value of Q is set to G in other cases.

As initial processing, 0 is given to the variable 1, variable 2, the variable 3 and the acceleration/deceleration flag as an initial value. The value of t0 in FIG. 3 obtained by the A/D conversion is set to the variable 1, and the value of t1 in FIG. 3 obtained by the A/D conversion is set to the variable 2. After the values are set, positive or negative signs of the variable 1 and the variable 2 are judged. When both signs are the same or one of the values is 0, the magnitude relation is evaluated by the absolute value of both signs.

After the evaluation, when the valuable 1 is larger, "1" is set to the acceleration/deceleration flag as the meaning of in the acceleration period. After the evaluation, when the variable 1 is smaller, "−1" is set to the acceleration/deceleration flag as the meaning of in the deceleration period. The variable 2 is subtracted from the variable 1 and the result is stored in the variable 3.

When the positive or negative signs of the variable 1 and the variable 2 are different or when the acceleration period or the deceleration period cannot be judged, "0" is set to the acceleration/deceleration flag.

As a value of a coefficient G of the formula (1), one of an acceleration coefficient P, a deceleration coefficient R and a coefficient Q, which is preliminarily determined as an intermediate value between the acceleration coefficient P and the deceleration coefficient R, is used for the calculation. For example, when P is "1.1" and R is "0.9", the condition is satisfied by setting "1.0," which is the intermediate value between P and R, to Q.

The obtained value of "F" is converted from digital to analog to obtain an actual voltage output.

In the next output, the value previously set to V1 is set to V0, and newly obtained value of the input signal of t1 in FIG. 3 is set to V1. Thus, the similar calculation is sequentially repeated and the D/A conversion is sequentially performed.

As explained above, the input signal is sequentially calculated and the result is converted from digital to analog. Thus, the electrical signal to drive the target speaker is obtained.

Figure 4:
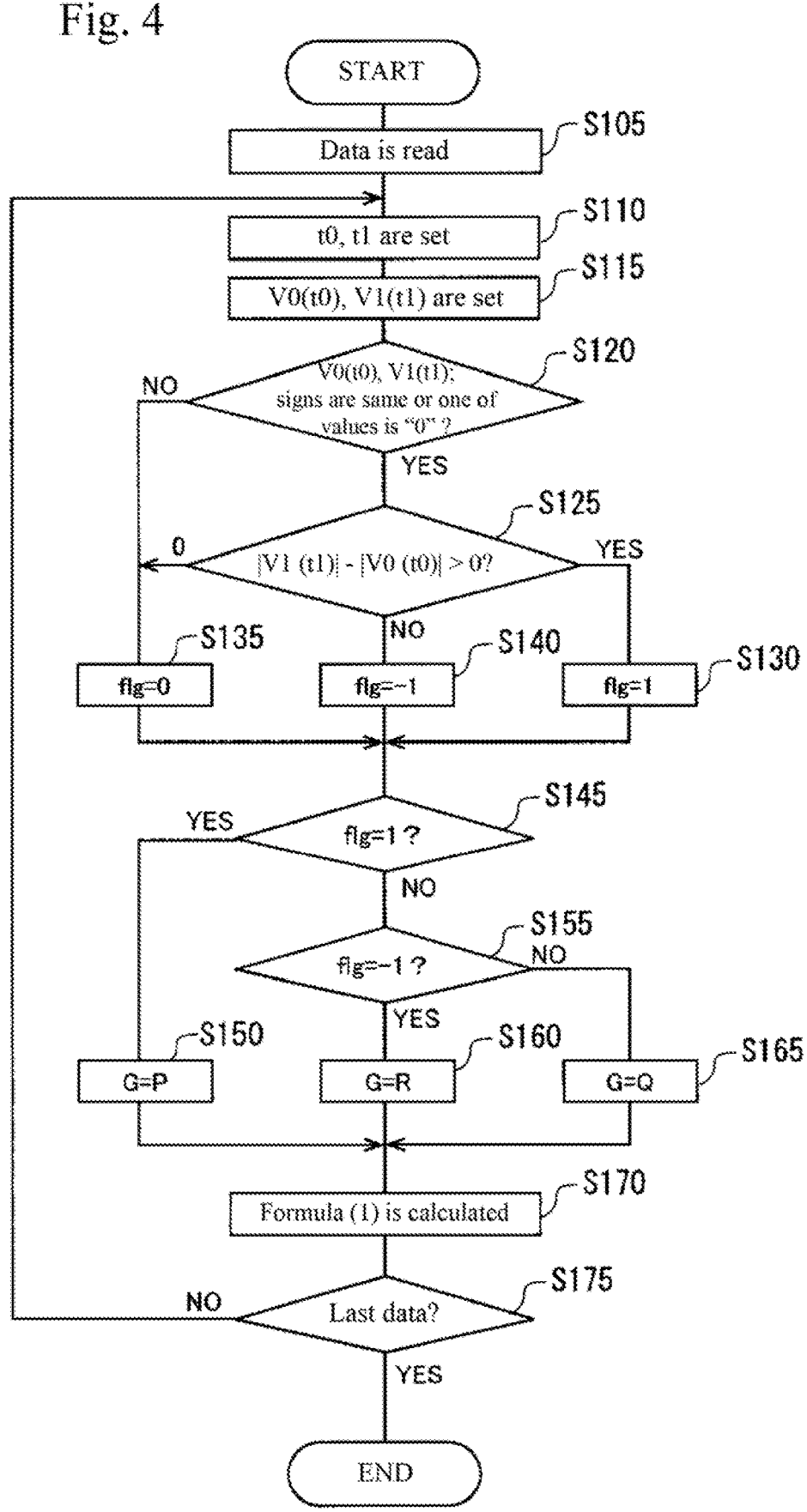
FIG. 4 is a flowchart showing a method of calculation performed by a calculator.

FIG. 4 is a flowchart showing a method of calculation performed by a calculator.

The calculator 9 of the DSP 3 corresponds to the computer. The calculator 9 includes a CPU, a ROM and a RAM, for example. Accordingly, the CPU executes the program corresponding to the flowchart shown in FIG. 4 written in the ROM by using the RAM, for example.

First, the data is read in Step S105. As described above, the data is sequentially inputted in time series and stored in a predetermined buffer. In Step S110, the times t0, t1 to be processed are set in time series. After that, the calculation is performed by using the data of the input signal of the times t0, t1. Accordingly, in Step S115, the data of the time t0 is set to the variable V0 and the data of the time t1 is set to the variable V1 as described above. This is shown as the settings of V0 (t0), V1 (t1).

In Step S120, whether positive or negative signs of V0 (t0) and V1 (t1) are the same or whether one of the values is "0" are evaluated. If one of the above described evaluation is satisfied, the judgement is made by using the following formula in Step S125.

$$|V1(t1)|-|V0(t0)|>0 \qquad (2)$$

Namely, whether the absolute value of V0 (t0) is larger than the absolute value of V1 (t1) is judged. If YES, "1" is set to the flag fig in Step S130 for indicating the acceleration.

However, if NO (i.e., the absolute value of V0 (t0) is smaller than the absolute value of V1 (t1) when the positive or negative sign is the same), "−1" is set to the flag fig in Step S140 for indicating the deceleration. If the absolute value of V0 (t0) is same as the absolute value of V1 (t1) exceptionally, there is no acceleration/deceleration. Thus, the step proceeds to Step S120.

In the above described processes, whether the speaker is in the acceleration period or in the deceleration period is judged based on a change of the audio signal at the minute time intervals. The above described judgement process and the judgement itself corresponds to the arithmetic unit. The above explanation is applied to the situation when the positive or negative signs of V0 (t0) and V1 (t1) are the same or one of the values is "0" in Step S120. In other situation (i.e., when the positive or negative signs of V0 (t0) and V1 (t1) are different from each other or when the acceleration/deceleration cannot be judged), "0" is set to the flag fig in Step S135.

Then, the appropriate coefficient G is set based on the values of the flag fig in Steps S145, S155. First, whether the flag flg is "1" or not is judged in Step S145. If YES (i.e., in acceleration period), the value P is set to the coefficient G in Step S150. Next, whether the flag flg is "−1" or not is judged in Step S155. If YES (i.e., in deceleration period), the value R is set to the coefficient G in Step S160. In the case when the above described judgement is not applied, the situation is neither in the acceleration period nor in the deceleration period. In such a case, the value Q is set to the coefficient G in Step S165.

As explained above, after whether in the acceleration period, in the deceleration period or neither of them is judged, the appropriate value is set to the coefficient G Thus, the formula (1) is calculated in Step S170.

In the above described processes, the change of the audio signal in the minute time interval is regarded as a difference data, and the drive signal of the speaker is calculated by multiplying the difference data by the acceleration coefficient or the deceleration coefficient. The above described judgement process and the judgement itself corresponds to the arithmetic unit.

After that, whether or not the data in the buffer is the last data in Step S175. If the data still exists in the buffer, the step returns to Step S110 and the processes are repeated. Note that it can be considered that the data is sequentially read from the buffer in Step S105.

As for the method of determining the coefficient P multiplied in the acceleration period and the coefficient R multiplied in the deceleration period, "1.05" is initially given to P and "0.95" is initially given to R as minute values, and a sine wave signal starting from "0" is given as the input signal. In that condition, how the speaker starts and vibrates is measured and examined. The result is recorded and then "1.1" is given to P, "0.9" is given to R, and a sine wave signal starting from "0" is given as the input signal. In that condition, how the speaker starts and vibrates is measured and the result is recorded. Based on the record of the results, relative merits are compared and judged between the conditions of the current result and the previous result. From the judgement result, better value is guessed and the test is repeated to determine the most appropriate value.

The most appropriate values of the acceleration coefficient P and the deceleration coefficient R can be also determined by actually setting temporary values, reproducing music for trial listening, setting different values for further trial listening, and selecting the values which a listener thinks the best.

In addition, the coefficients of P, Q and R can have a structure capable of being freely set from outside by an input device as long as the absolute values of the coefficients satisfies the conditions of the formula (3).

$$|P|>|Q|>|R| \qquad (3)$$

As explained above, the signal generator of the present invention can be achieved by using the DSP 3 for calculating the formula (1) using the coefficients of P, Q and R.

As explained above, from the relation of the coefficient P, the coefficient Q and the coefficient R, it can be said that the arithmetic unit performs the calculation in a state that the acceleration coefficient for calculating the drive signal in the acceleration period is different from the deceleration coefficient for calculating the drive signal in the deceleration period.

In addition, from the relation of the coefficient P, the coefficient Q and the coefficient R, it can be said that the acceleration coefficient is larger than the deceleration coefficient in absolute value in the arithmetic unit.

Note that the processes of the arithmetic unit cannot be distinguished easily from outside in many cases. However, when the drive signal is observed as the calculation result, if the drive signal in the acceleration period is larger (greater) than the drive signal in the deceleration period, it can be said to be equivalent to use the above described coefficients.

Furthermore, it is also an embodiment of the present invention to obtain a larger drive signal when a cone paper of the speaker once stops and starts to move again. Namely, although the drive signals are same between the acceleration period and the deceleration period after the speaker starts to move, the drive signal is made larger when the speaker starts to move. After that, the drive signals are gradually changed so that the magnitudes of the drive signals are not different between the acceleration period and the deceleration period.

An example of the signal which is a result of the above described calculation is shown in FIG. 3 as an output signal 14.

When the sine wave of the input signal 13 is shown by a phase angle, 1st quadrant (i.e., 0 to $\frac{1}{2}\pi$) corresponds to the acceleration period, 2nd quadrant (i.e., $\frac{1}{2}\pi$ to $\pi$) corresponds to the deceleration period, 3rd period quadrant (i.e., $\pi$ to $3/2\pi$) corresponds to the acceleration period, and 4th period (i.e., $3/2\pi$ to $2\pi$) corresponds to the deceleration period.

As shown as the output signal 14 in FIG. 3, discontinuous signal appears in the obtained power change signal when the speaker starts to move immediately after the static state as a result of applying the brake. When the speaker is driven by the above described discontinuous signal, the speaker vibrates more correctly. Thus, sound with less distortion can be reproduced.

The speaker to which the output signal of the DSP 3 amplified by the power amplifier 4 is output is different from the conventional one.

The signal obtained by the signal generator of the present invention is the signal of +6 dB/oct as the generated power change signal. Therefore, the speaker to be used in combination with the signal generator of the present invention should have a property of −6 dB/oct to perform the reproduction flatly.

Accordingly, the special speaker should have a property of −6 dB/oct with respect to a frequency band to be reproduced. Therefore, the speaker adjusted to have a property of −6 dB/oct can be used. The above described adjustment is easier than adjusting to have a flat property by the conventional audio signal having a constant amplitude.

As explained above, when the speaker adjusted to have a property of −6 dB/oct is used and the speaker drive signal having a property of +6 dB/oct in a frequency band to be reproduced is input, output characteristics are approximately constant.

The special speaker should be a speaker prepared for reproducing the signal obtained by the signal generator of the present invention. Accordingly, a circuit and a mechanism for eliminating a high frequency component of the signal having a higher frequency than a reproduction band by a filter or the like should not be provided.

Next, the method of outputting the signal obtained by the signal generator of the present invention to the conventional speaker will be explained. It can be achieved by setting a filter having a property of −6 dB/oct to the input unit of the signal generator of the present invention. Actually, it can be achieved by forming and using a digital filter by the DSP 3 without using a separate filter. It can be said that an SN ratio becomes extremely worse and the speaker does not fit for practical use when an analog filter is used. Therefore, the speaker can be used by achieving −6 dB/oct by the digital filter of the DSP 3.

As explained above, a speaker filter for performing a filtering processing of −6 dB/oct with respect to a sound signal to be reproduced in a frequency band to be reproduced corresponds to the speaker filter.

Of course, the signal generator of the present invention and the above described special speaker can be combined to achieve the present invention as a system. However, as a restriction of the case of using the above described combination, when a multi-unit is used, the signal generator of the present invention and the amplifier are required for each of the units having different reproduction bands with each other. The combination is not limited to the actually integrated case. Even the case of connecting the devices by using a cable, a cord and the like when using the devices is also an effective embodiment since the combination can be established also in such a case.

Next, it is also possible to set a filter having a property of −6 dB/oct to the input unit of the signal generator of the present invention to combine the conventionally used speaker unit. As a restriction of the case of using the above described combination, when a multi-unit is used, the signal generator to which the filter and the amplifier are set to each reproduction band is required.

The combination is not limited to the actually integrated case. Even the case of connecting the devices by using a cable, a cord and the like when using the devices is also an effective embodiment since the combination can be established also in such a case.

In the conventional audio system, the sound signal is amplified as it is to drive the speaker.

However, in reality, the diaphragm of the speaker and air itself have a weight. Therefore, the power change signal is calculated from the sound change signal as a drive signal of the speaker, and the original sound reproduction method has invented for using the power change signal.

In addition, the present invention generates the signal by further considering the influence of the resistance and friction when the diaphragm moves. Thus, the speaker is driven by amplifying the signal. Now, there is a tendency to seek a device of reproducing higher sound quality such as High-Resolution Audio. The effect which cannot be solved by these conventional methods can be obtained by the present invention. Furthermore, a device of reproducing high sound quality can be obtained in spite of a low cost. Therefore, the interest of the consumers in the audio will be increased. Thus, the consumers should replace the currently used devices and the related industries would increase the production to respond to the increasing demand. Consequently, the related industries are developed.

In the conventional devices, the correlation between the price and the sound quality is small. Even if the price is high, there is no guarantee that the sound quality is good.

However, the correlation between the price and the sound quality becomes clearer by using the present invention. The expensive devices can reproduce the sound faithfully at certain high level. Thus, the products can be easily accepted by the consumers and expected to be spread considerably.

Note that the present invention is not limited to the above described embodiments of the invention. Other various configurations can be adopted within the range not deviated from the principle of the present invention.

For example, the kinds (e.g., driving method) of the speaker to which the present invention is applied are not limited. In addition to the generally used cone paper, the same can be applied even when the material of the cone paper is changed. Furthermore, recently developed new speakers can be also used. From a viewpoint of considering the weight of the air, the same can be applied to an ion speaker without using the cone paper.

As for the unit of the vertical axis shown in FIG. 3, the input signal of showing the substantially same change with the speed can be used. Other units than the speed and sound pressure can be used as the input signal.

DESCRIPTION OF THE REFERENCE NUMERALS

1: microphone,
2: preamplifier,

3: DSP,
4: power amplifier,
5: speaker,
6: sound input signal terminal,
7: A/D converter,
8: digital signal bus,
9: calculator,
10: digital signal bus,
11: D/A converter,
12: speaker drive signal output terminal,
13: input signal,
14: output signal

The invention claimed is:

1. A signal generator for obtaining a drive signal of a speaker by a predetermined calculation based on an audio signal at minute time intervals in an acceleration period in which the speaker operates to push air toward a predetermined direction and in a deceleration period in which the speaker performs a deceleration operation contrary to the acceleration period, the signal generator comprising:
   an audio signal input unit for inputting the audio signal at the minute time intervals;
   an arithmetic unit calculating the drive signal of the speaker; and
   a drive signal output unit for outputting the drive signal of the speaker, wherein
   in the arithmetic unit, an acceleration coefficient for calculating the drive signal in the acceleration period is different from a deceleration coefficient for calculating the drive signal in the deceleration period, and
   in the arithmetic unit, the change of the audio signal at the minute time intervals is regarded as a difference data and the drive signal of the speaker is calculated by multiplying the difference data by the acceleration coefficient or the deceleration coefficient.

2. The signal generator according to claim 1, wherein the arithmetic unit judges whether the speaker is in the acceleration period or in the deceleration period based on a change of the audio signal at the minute time intervals.

3. The signal generator according to claim 1, wherein the acceleration coefficient is larger than the deceleration coefficient in absolute value in the arithmetic unit.

4. A signal generator for obtaining a drive signal of a speaker by a predetermined calculation based on an audio signal at minute time intervals in an acceleration period in which the speaker operates to push air toward a predetermined direction and in a deceleration period in which the speaker performs a deceleration operation contrary to the acceleration period, the signal generator comprising:
   an audio signal input unit for inputting the audio signal at the minute time intervals;
   an arithmetic unit calculating the drive signal of the speaker; and
   a drive signal output unit for outputting the drive signal of the speaker, wherein
   the arithmetic unit calculates the drive signal so that the drive signal is larger in the acceleration period than the deceleration period, and
   in the arithmetic unit, the change of the audio signal at the minute time intervals is regarded as a difference data and the drive signal of the speaker is calculated by multiplying the difference data by the acceleration coefficient or the deceleration coefficient.

5. A speaker driven by a drive signal output by a signal generator for obtaining the drive signal of the speaker by a predetermined calculation based on an audio signal at minute time intervals in an acceleration period in which the speaker operates to push air toward a predetermined direction and in a deceleration period in which the speaker performs a deceleration operation contrary to the acceleration period, the signal generator comprising:
   an audio signal input unit for inputting the audio signal at the minute time intervals;
   an arithmetic unit calculating the drive signal of the speaker; and
   a drive signal output unit for outputting the drive signal of the speaker, wherein
   the arithmetic unit calculates the drive signal so that the drive signal is larger in the acceleration period than the deceleration period, and the speaker does not include a circuit and a mechanism for eliminating a high frequency component of the drive signal having a higher frequency than a predetermined frequency, and
   in the arithmetic unit, the change of the audio signal at the minute time intervals is regarded as a difference data and the drive signal of the speaker is calculated by multiplying the difference data by the acceleration coefficient or the deceleration coefficient.

6. The speaker according to claim 5, wherein output characteristics are approximately constant when the drive signal of the speaker having a property of +6 dB/oct is input in a frequency band to be reproduced.

* * * * *